United States Patent [19]

Sasazawa et al.

[11] 4,015,030
[45] Mar. 29, 1977

[54] PROCESS FOR STABILIZATION OF FERROMAGNETIC MATERIAL AND MAGNETIC RECORDING MEMBER

[75] Inventors: Koji Sasazawa; Yasuyuki Yamada; Tatsuji Kitamoto; Goro Akashi, all of Odawara, Japan

[73] Assignee: Fuji Photo Film Co., Ltd., Minami-ashigara, Japan

[22] Filed: June 30, 1975

[21] Appl. No.: 591,681

[30] Foreign Application Priority Data

June 28, 1974 Japan .............................. 49-74005

[52] U.S. Cl. .............................. 427/130; 252/62.56
[51] Int. Cl.$^2$ ...................................... H01F 10/02
[58] Field of Search ......... 252/62.55, 62.56, 62.59, 252/62.6, 62.62–62.64; 427/130

[56] References Cited

UNITED STATES PATENTS

| | | | |
|---|---|---|---|
| 2,418,467 | 4/1947 | Ellis et al. | 252/62.56 X |
| 3,075,919 | 1/1963 | Gruber et al. | 252/62.56 X |
| 3,374,113 | 3/1968 | Chang et al. | 427/130 X |
| 3,573,980 | 4/1971 | Haller et al. | 252/62.56 X |
| 3,748,270 | 7/1973 | Hwang | 252/62.56 |
| 3,759,745 | 9/1973 | Dixon et al. | 427/130 X |
| 3,770,500 | 11/1973 | Imaoka et al. | 427/130 X |

*Primary Examiner*—Jack Cooper
*Attorney, Agent, or Firm*—Sughrue, Rothwell, Mion, Zinn & Macpeak

[57] ABSTRACT

A process for stabilizing a ferromagnetic material comprising heat-treating a needle-like ferromagnetic material represented by the formula $MO_x$ wherein M is a ferromagnetic metal ion or a ferromagnetic non-metal ion and another metal ion, and x is the degree of oxidation which ranges from 1.36 to 1.47, and containing at least 0.5 atom % Co, at a temperature of at least about 40° C, and a process for stabilizing a magnetic recording member comprising heat-treating a magnetic recording member produced by providing a ferromagnetic recording layer comprising (a) a ferromagnetic material represented by the formula $MO_x$ wherein M and x are the same as defined above, and containing at least 0.5 atom % Co, and (b) a binder, on a support, at a temperature of at least about 40° C.

9 Claims, No Drawings

PROCESS FOR STABILIZATION OF FERROMAGNETIC MATERIAL AND MAGNETIC RECORDING MEMBER

BACKGROUND OF THE INVENTION

1. Field of the Invention

The present invention relates to a process for stabilizing the magnetic properties of a ferromagnetic powder. More particularly, the present invention relates to a process for improving variation with time, and stability to pressure and mechanical force of the magnetic properties of iron oxide ($MO_x$, $x=1.36$ to $1.47$) which has a high coercive force (Hc) due to doping with Co. Further, the present invention relates to a process for stabilizing a magnetic recording member using the above ferromagnetic powder.

2. Description of the Prior Art

The production of high density magnetic recording members requires magnetic materials having a high coercive force and squareness ratio (ratio of residual magnetic flux to saturated or maximum magnetic flux, Br/Bm), and having a high magnetic flux density.

In increasing the coercive force of iron oxide based magnetic powders, the incorporation of cobalt is effective, and this method is described in, for example, U.S. Pat. No. 3,117,933, Japanese Patent Publication No. 6538/1966, Japanese Patent Publication No. 6113/1967 corresponding to U.S. Pat. No. 3,047,505, Japanese Patent Publication No. 15759/1973, Japanese Patent Publication No. 10994/1973 corresponding to British Pat. No. 1,318,579, and U.S. Pat. No. 3,671,435.

Since cobalt is relatively expensive, from a commercial standpoint the high coercive force preferably is obtained by the use of a small amount of cobalt, and furthermore, the amount of cobalt used preferably is small since cobalt also causes various disadvantages, that is, cobalt decreases the magnetic flux density as an impurity and increases the lack of stability of magnetic materials to mechanical force.

It is well known that partially reduced Co-containing maghemite ($\gamma$-$Fe_2O_3$) has increased coercive force due to the use of a small amount of cobalt.

This method is described in U.S. Pat. No. 3,573,980 and Japanese Patent Application (OPI) No. 51296/1973 (corresponding to U.S. Pat. No. 3,748,270), etc.

When a Co-containing iron oxide, particularly a magnetic material produced by doping cobalt onto an iron oxide having an oxidation ratio between those of magnetite ($Fe_3O_4$) and maghemite ($\gamma$-$Fe_2O_3$), is allowed to stand after a heat-treatment at high temperatures, various changes with time, such as an increase in coercive force with time, an increase of print-through signals when a magnetic tape produced using the magnetic material is woundup and stored, and a decrease in magnetization due to mechanical friction and pressure are observed.

In overcoming the above undesirable properties, particularly the decrease in magnetization due to mechanical friction and pressure, Japanese patent application No. 28423/1974 (OPI) No. 119997/1975 (corresponding to U.S. patent application Ser. No. 557,431, filed Mar. 11, 1975) discloses the subjecting of magnetic materials to a heat-treatment at temperatures of from about 40° to 100° C, and the obtaining of an oxidation ratio of about 30 to 80%, as defined by the following relationship (I)

$$\text{Oxidation Ratio (\%)} = \left(1 - \frac{300 - y}{100 - y} \times R\right) \times 100 \quad \text{(I)}$$

wherein $y$ is the amount of a divalent metal ions contained in a magnetic iron oxide (atom %) other than divalent iron ions, and R is the ratio of the content of divalent iron ions to the total content of iron ions forming the magnetic iron oxide. When $y$ in the relationship (I) is 0, that is, when no divalent metal is present other than iron ions, $MO_x$ is $FeO_x$ and the relationship (I) becomes as follows:

$$\text{Oxidation Ratio (\%)} = 100(6x-8) \quad \text{(II)}$$

The present invention further improves this method.

The variation with time of the coercive force at room temperature (about 20°–30° C) of an iron oxide having an oxidation ratio between those of Co-containing magnetite and $\gamma$-$Fe_2O_3$ is described in Umeki et al, *Variation with Time in Coercive Force of Cobalt-containing Iron Oxide Particles*, Autumn Congress Abstract (1973), pp. 133 to 135 (October, 1971), published by Funtai Funmatsu Yakin Kyokai, and this variation is a serious problem in magnetic powders.

Maghemite ($\gamma$-$Fe_2O_3$) and magnetite ($Fe_3O_4$) can be used as the iron oxide, but Berthollide iron oxide ($FeO_x$ where $x$ is the oxidation degree) (which is disclosed in Japanese Patent Publication Nos. 5,009/64, 10,307/64 and 39,639/73) is especially effective presumably because diffusion of Co into such an oxide is easy. Berthollide iron oxides ($FeO_x$) having an oxidation degree, as defined by the above-described relationship (I), of about 15 to 90% are especially effective.

In the above-described Berthollide iron oxide, $x$ ranges from more than 1.33 to less than 1.50, preferably 1.36 to 1.49. Berthollide iron oxide is produced by following process.

a. A reduction of maghemite ($FeO_x$, $x = 1.50$) to magnetite ($FeO_x$, $x = 1.33$) where the reduction is stopped when $1.33 < x < 1.50$ as set forth in Japanese Patent Publication Nos. 5,009/64 and 39,639/73.

b. An oxidation process of magnetite to maghemite where the oxidation is stopped when $1.33 < x < 1.50$ as described in Japanese Patent Publication Nos. 5,009/64 and 10,307/64.

Berthollide iron oxide produced by processes as described above is an iron oxide having an oxidation degree between that of magnetite ($Fe_3O_4$:$FeO_x$, $x = 1.33$) and the maghemite ($\gamma$-$Fe_2O_3$:$FeO_x$, $x = 1.50$), and having a very high coercive force, decreased electrical resistance, and improved dispersibility in an organic solvent. Then, the print-through effect of a recorded signal to another magnetic recording layer is decreased. On the other hand, maghemite and magnetite can be used in combination, and the characteristics thereof are similar but not superior to those of the above-described Berthollide iron oxide.

SUMMARY OF THE INVENTION

An object of the present invention is to provide a stabilization method whereby the variation with time of the coercive force of ferromagnetic powders represented by the general formula $MO_x$ is reduced.

Another object of the present invention is to provide a method of improving the print-through effect of ferromagnetic powders.

Another object of the present invention is to provide a method of improving resistance to mechanical friction of ferromagnetic powders.

Another object of the present invention is to provide a method of reducing the decrease in magnetization due to pressure of ferromagnetic powders.

Another object of the present invention is to provide a method of stabilizing magnetic recording members produced using ferromagnetic powders represented by the general formula $MO_x$.

It has been found that magnetic powders or magnetic recording media can be stabilized in a short period of time by subjecting them to an aging-treatment at temperatures higher than room temperature, more particularly at temperatures higher than about 40° C, and that where the aging temperature is lower than 70° C, the properties at 70° C reach equilibrium quickly, but this equilibrium value is a function of temperature and the difference between the quilibrium values at room temperature and a 70° C is large, and, as a result, this difference causes or corresponds to the variation with time of each property at room temperature.

Accordingly, the present invention provides a method of stabilizing a ferromagnetic powder which comprises treating a needle-like ferromagnetic powder represented by the general formula $MO_x$ wherein M is a ferromagnetic metal ion or a ferromagnetic non-metal ion and another metal ion, and $x$ is the degree of oxidation of from 1.36 to 1.47, and containing at least about 0.5 atom % Co, at a temperature of at least about 40° C.

Furthermore, the present invention provides a method of stabilizing a magnetic recording member which comprises treating a magnetic recording member produced by providing a magnetic recording layer comprising a needle-like ferromagnetic powder represented by the formula $MO_x$ wherein M and $x$ are the same as defined above, and containing at least about 0.5 atom % Co and a binder on a support, at a temperature of at least about 40° C.

DETAILED DESCRIPTION OF THE INVENTION

Although the mechanism of this phenomenon is not presently clear, and while not desiring to be bound, the following explanation of the mechanism is possible. The distribution of Co and $Fe^{++}$ ions determines the magnetic anisotropy, and this distribution is a function of temperature. With a change in temperature, the ions arrange to achieve a distribution that is in equilibrium with each temperature, which is followed by a diffusion of the ions. Thus, particularly where the temperature is low, a long period of time is required for an equilibrium state to be obtained. If magnetic material particles having a high coercive force are used due to the large shape anisotrapy, an increase in and stabilization of magnetic properties due to the arrangement of the above Co ions proceeds effectively.

The incorporation of at least about 0.5 atom % Co is a requirement for obtaining the high coercive force necessary for high density magnetic recording arising from the crystal magnetic anisotropy due to the Co. Further, where a ferromagnetic material is represented by the formula: $MO_x$ (where M is a ferromagnetic metal ion, or another metal), the degree of oxidation, i.e., $x$, must be in the range of from 1.37 to 1.47, which is a requirement for further increasing the coercive force from the mutual interaction of $Co^{++}$ and $Fe^{++}$ ions, and also for improving the print-through, mechanical friction, and a decrease in magnetization due to pressure. Ferromagnetic metal ions represented by M include Fe, Co, and Ni ions, and as other metal ions, Mn, Mg, Ti, Cr, Cu, Zn, Pb, or like ions can be used. These other metal ions are described in Japanese Patent Publication No. 8035/1959, which discloses iron oxide (maghemite or magnetite) doped to an extent of about 7.5 to 10 atomic % cobalt and/or chromium, and about 3 to 5 atomic % of at least one atom selected from the group consisting of copper, nickel, magnesium, zinc, titanium, manganese and lead.

Co in an amount ranging from about 0.5 atom % to about 20 atom % is effective in the magnetic recording field, but where the ferromagnetic materials are used in a video cassette, a master tape, and the like which are high density recording materials whose coercive forces are about 500 to 1,500 oe, the amount of Co employed preferably ranges from 1 to 10 atom %.

In the formula $MO_x$, $x$ indicates the degree of oxidation, and in the present invention, $x$ ranges from 1.36 to 1.47. Using the relationship (I) in which the cobalt content is varied and the ratio of $Fe^{2+}$ to $Fe^{3+}$ is taken into account, the oxidation ratio preferably ranges from 35 to 65%.

Where the oxidation ratio is low, e.g., below 35%, the composition of the magnetic material approaches that of magnetite ($Fe_3O_4$) and the print through ratio, i.e., the transfer effect, becomes poor. The print through ratio is improved as the oxidation ratio increases, and when $x$ is above 1.36, using the formula $MO_x$, an improvement in the print-through is observed. When the oxidation ratio of relationship (I) is above 35%, the improvement in the print through ratio is significant. On the other hand, where the oxidation ratio is high, e.g., above 65%, the composition of the magnetic substance approaches that of maghemite ($\gamma$-$Fe_2O_3$). In this case, the print through ratio is good, but when $x$ is above 1.48, variation with time in the magnetic properties of the magnetic material occurs, and the magnetic material becomes unstable to pressure and mechanical friction. Where the oxidation ratio is above 65%, the magnetic material cannot be completely stabilized even by application of the heat-acceleration treatment of the present invention. Further, when $x$ is above 1.48, the magnetic flux density of the magnetic material decreases. The advantage of an iron oxide containing $Fe^{2+}$, i.e., an increase in magnetic flux, is lost, since the affinity between a binder and a magnetic material is high and the content of a magnetic powder in the magnetic layer decreases.

The magnetic particles have a needle-like form, and more specifically, it is preferred that the magnetic particles have length to width ratios of greater than about 2:1. More particularly, when a magnetic material containing cobalt therein is heated to 150° C in an atmosphere of nitrogen, and the coercive force is measured at this temperature, i.e., at 150° C, it is preferred that the coercive force be larger than the A-value defined by the following relation (III)

$$A(Oe) = Hc(150° C) - 7[Co] \tag{III}$$

wherein Hc(150° C) is the coercive force of a Co-containing iron oxide at 150° C, and [Co] indicates the atomic ratio % of Co to Fe+Co in the magnetic material. This A-value is a value which is corrected for the crystal magnetic anisotropy since the crystal magnetic anisotropy of Co becomes small.

In the present invention, those materials having higher A-values are preferred, and particularly Co-containing iron oxides having A-values higher than about 250 Oe, are preferred. A-values of less than about 250 Oe are not preferred since the orientation of the particles is deteriorated.

The definition of particle shapes by such a coercive force is supported by the fact that iron oxides produced from non-magnetic needle-like iron oxides such as goethite ($\alpha$-FeOOH), lepidocrosite (FeO/OH)), and the like through dehydration, reduction, oxidation, or a like treatment, which are porous and do not have a completely planar particle shape, i.e., have a skeleton particle shape, sometimes have the properties of magnetic needle-like crystals even though the needle-like shapes can not be observed with an electron microscope.

The aging-treatment of the present invention is carried out under the conditions of a temperature of from about 40° C to about 80° C, preferably about 50° to 60° C, and an aging period of from about 1 hour to about 1 week, preferably from about 1 hour to about 3 days. For example, where the aging is completed by heat-treatment at a temperature of about 50° to 60° C, the equilibrium value approaches more than 90% of the equilibrium value at room temperature in a period of the order of 24 to 48 hours, which is quite useful for producing such magnetic materials industrially.

The heat-treatment temperature of the present invention need not be constant during the processing, and the effect of the present invention can be attained by combining suitably a temperature and a processing period within the range of about 40° to 80° C.

The heat-treatment of the present invention is preferably carried out in an atmosphere of an inert gas such as $N_2$, He, Ne, Ar, Kr, Xe, and the like, but this is not essential.

The thus obtained magnetic iron oxides are, as in conventional magnetic recording members, combined with binders such as thermoplastic or thermosetting resins, and the resulting mixtures are coated on supports and dried to produce magnetic recording members.

Useful thermoplastic resins have a softening point of lower than about 150° C, a mean molecular weight of about 10,000 to 200,000 and a degree of polymerization of about 200 to 2,000, and include the following polymers; vinyl chloride-vinyl acetate copolymers, vinyl chloride-vinylidene chloride copolymers, vinyl chloride-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, polyvinyl fluoride resins, vinylidene-chloride-acrylonitrile copolymers, butadiene-acrylonitrile copolymers, polyamide resins, polyvinyl butyral, cellulose derivatives (cellulose acetate butyrate, cellulose diacetate, cellulose triacetate, cellulose propionate, nitrocellulose), styrene-butadiene copolymers, polyester resins, chlorovinyl ether-acrylic ester copolymers, amino resins, various synthetic rubber resins and mixtures thereof.

These theroplastic binder resins are described in Japanese Patent Publication Nos. 6,877/62, 12,528/64, 19,282/64, 5,349/65, 20,907,65, 9,463/66, 14,059/66, 66,985/66, 6,428/67, 11,621/67, 4,623/68, 15,206/68, 2,889/69, 17,947/69, 18,232/69, 14,020/70, 14,500/70, 18,573/72, 22,068/72, 22,069/72, 22,070/72, and 27,886/72, and U.S. Pat. Nos. 3,144,352, 3,419,420, 3,499,789 and 3,713,887.

Useful thermosetting resins have a molecular weight of less than about 200,000 as a coating solution, but the molecular weight becomes infinity due to the condensation and addition reactions occurring on heating the coating solution. Such resins are preferably not softened or melted before they thermally decompose. Examples of thermosetting resins are phenol resins, epoxy resins, polyurethane hardening resins, urea resins, melamine resins, alkyd resins, silicone resins, acrylic reactive resins, epoxy-polyamide resins, nitrocellulose-melamine resins, a mixture of a high molecular weight polyester resin and an isocyanate prepolymer, a mixture of a methacrylic copolymer and a diisocyanate prepolymer, a mixture of a polyesterpolyol and a polyisocyanate, urea-formaldehyde resins, a mixture of a low molecular weight glycol, a high molecular weight diol and triphenylmethanetriisocyanate, polyamine resins and mixtures thereof.

These resins are described in Japanese Patent Publication Nos. 8,103/64, 9,779/65, 7,192/66, 8,106/66, 14,275/66, 18,179/67, 12,081/68, 28,023/69, 14,501/70, 24,902/70, 13,103/71, 22,065/72, 22,066/72, 22,067/72, 22,072/72, 22,073/72, 28,045/72, 28,048/72 and 28,922/72, and U.S. Pat. Nos. 3,144,353, 3,320,090, 3,437,510, 3,597,273, 3,781,210, and 3,781,211.

The binder can be used individually or as mixtures thereof. Other ingredients, such as dispersing agents, lubricants, abrasive agents and anti-static agents, can be added to the binder. The weight ratio of the ferromagnetic powder to the binder can suitably range from about 100:10 to 100:200.

Useful dispersing agents are caprylic acid, capric acid, lauric acid, myristic acid, palmitic acid, stearic acid, oleic acid, elaidic acid, linoleic acid, linolenic acid, stearolic acid or like fatty acids represented by the formula $R_1COOH$ (where $R_1$ is an alkyl or alkenyl group having 11 to 17 carbon atoms), e.g., caprylic acid, capric acid, lauric acid, myristic acid, palmitic acid, stearic acid, oleic acid, elaidic acid, linolic acid, linolenic acid, stearolic acid, etc., alkali metal (Li, Na, K, etc.) or alkaline earth metal (Mg, Cs, Ba, etc.) salts of these fatty acids, and lecithin. Higher alcohols having more than 12 carbon atoms and the sulfuric esters thereof can be used.

Such a dispersing agent is employed in the binder in a weight ratio of the dispersing agent to the binder of about 10:100 to 20:100. Suitable dispersing agents are described in Japanese Pat. Nos. 28,369/64, 17,945/69 and 15,001/73, and U.S. Pat. Nos. 3,387,993 and 3,470,021.

Useful lubricants are silicone oils, graphite, molybdenum disulfide, tungsten disulfide, fatty acid esters of monocarboxylic fatty acids having 12 to 16 carbon atoms and monohydric alcohols having 3 to 12 carbon atoms, and fatty acid esters of monocarboxylic fatty acids having more than 17 carbon atoms and monohydric alcohols, in which the total number of carbon atoms in the ester is 15 to 28. 0.2 to 2.0 weight parts of such a lubricant are generally employed per 100 parts of the binder. These lubricants are described in Japanese Patent Publication Nos. 23,889/68, and 28,043/72, Japanese patent application Nos. 28,647/67 Publication No. 24,041/73 and 81,543/68 Publication No. 18,482/73, and U.S. Pat. No. 3,423,233.

Useful abrasives are fused alumina, silicon carbide, chromium oxide, corundum, synthetic corundum, diamond, synthetic diamond, garnet and emery (main components are corundum and magnetite). A suitable abrasive has a mean particle size of about 0.05 to 2 $\mu$m, preferably 0.1 to 2 $\mu$m. Generally about 7 to 20 weight parts of the abrasive particles are employed per 100 weight parts of the binder. These abrasives are described in Japanese patent application No. 26,749/73 (OPI) No. 115,510/74.

Useful anti-static agents are inorganic materials such as carbon black; organic materials such as saponin or like natural surfactants, alkyleneoxides, glycerin, glycidol or like nonionic surfactants, higher alkylamines, quaternary ammonium salts, pyridinum or like heterocyclic compounds, phosphonium, sulfonium or like cationic surfactants, carboxylic acids, sulfonic acids, phosphoric acids, anionic surfactants containing sulfuric acid ester groups, phosphoric acid ester groups or like acidic groups, aminoacids, aminosulfonic acids, sulfuric or phosphoric esters of aminoalcohols or like ampholytic surfactants. A suitable amount of the inorganic material is about 5% by weight and of the organic material is about 0.5 to 1% by weight, each based on the weight of the ferromagnetic material.

Some of these surfactant compounds used as the anti-static agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German Patent Application (OLS) No. 1,942,665, British Pat. Nos. 1,007,317 and 1,198,450, R. Oda et al, *Synthesis of the Surface Active Agents and Their Applications*, Maki Shoten (1964), A. M. Perry et al., *Surface Active Agents*, Interscience Publications Inc., (1958), J. P. Sisley et al, *Encyclopedia of Surface Active Agents*, Vol. 2, Chemical Publishing Co., (1964), and *Surface Active Agent Handbook*, sixth Edition, Sangyo Tosho K.K., (Dec. 20, 1966).

These surface active agents can be used individually or as mixtures. The surfactant is used not only for inhibiting the formation of static electricity but also for improving the dispersing, lubricating and coating properties and the magnetic properties of the resulting recording member.

The formation of the magnetic recording layer can be carried out by dispersing the iron oxide mixture in an organic solvent and applying the resulting composition on a support. A suitable coating thickness of the magnetic layer on the support ranges from about 0.5 to 20 $\mu$m, preferably 2 to 15 $\mu$m.

The non-magnetic support can have a thickness of about 2.5 to 100 $\mu$m, preferably 3 to 40 $\mu$m, for a tape, and suitable supports are polyethylene terephthalate, polyethylene naphthalate or like polyesters, polypropyrene or like polyolefins, cellulose triacetate, cellulose diacetate or like cellulose derivatives, polyvinyl chloride or like vinyl resins, polycarbonate or like synthetic resins, aluminum, copper or other metals, glass or ceramics, etc.

Useful organic solvents for kneading the iron oxide particles and coating the resulting composition are acetone, methyl ethyl ketone, methyl isobutyl ketone, cyclohexanone or like ketones, methanol, ethanol, propanol, butanol or like alcohols, methyl acetate, ethyl acetate, butyl acetate, ethyl lactate, glycol acetate monoethyl ether, or like esters, diethyl ether, glycol dimethyl ether, glycol monoethyl ether, dioxane or like ethers, benzene, toluene, xylene, or like aromatic hydrocarbons, methylene chloride, ethylene chloride, carbon tetrachloride, chloroform, ethylene chlorohydrin, dichlorobenzene or like chlorinated hydrocarbons, etc.

For coating the iron oxide containing mixture on a support, an air doctor coating method, a blade coating method, an air knife coating method, a squeeze coating method, a dip coating method, a reverse roll coating method, a transfer roll coating method, a kiss coating method, a cast coating method, and a spray coating method can be used. The details of these coating methods are described in *Coating Engineering*, pp. 253 to 277, Asakura Shoten (Mar. 20, 1971).

A method of stabilizing a magnetic recording member is explained hereinafter. In this method, a ferromagnetic powder was used which was the same as used in the method as described above, but which was not subjected to the heat-treatment of the above method. That is, initially, a ferromagnetic powder represented by the formula $MO_x$ wherein M is a ferromagnetic metal ion, or a ferromagnetic metal ion and another metal ion, and $x$ is the degree of oxidation of from 1.36 to 1.47, and containing at least 0.5 atom % Co was combined with a binder, and the resulting mixture was, if desired together with other additives, coated on a support and dried, and the thus obtained layer was subjected to magnetic orientation whereby a magnetic recording member was obtained.

The thus obtained magnetic recording member was stabilized by applying the same treatment as used in the method of stabilizing a magnetic powder per se. That is, the stabilization was carried out by heat-treatment under the conditions of a temperature of from about 40° to about 80° C, preferably about 50° to 60° C, and a period of from about 1 hour to about 1 week, preferably about 1 hour to 3 days.

The equilibrium value of the thus treated magnetic recording member reached more than 90% of that at room temperature in a short period of time, and thus the commercial production of such magnetic recording members can be carried out quite efficiently.

Other conditions were the same as used in the case of the stabilization of ferromagnetic powders per se.

Some of the effects and advantages of the present invention are as follows:

1. The magnetic properties of a magnetic iron oxide, which vary greatly with time, can be previously stabilized during the production thereof.

2. In accordance with the method of the present invention, the stabilization of the magnetic properties can be definitely achieved in a short period of time, e.g., within one week, and under preferred conditions, within a period of from one hour to 3 days, whereas in accordance with conventional methods, a long period of time is required.

3. The cocercive force (Hc) is stabilized, and further improved magnetic iron oxides can be obtained.

4. Magnetic iron oxides can be obtained which are capable of providing magnetic recording members with an improved print through ratio, i.e., transfer effect.

5. Magnetic iron oxides can be obtained which are capable of providing magnetic recording members in which the degree of decrease in magnetization due to mechanical friction is minimized and which are capable of providing stabilized magnetic recording members.

6. Magnetic iron oxides can be obtained which are capable of providing magnetic recording members in which the degree of decrease in magnetic force due to pressure is minimized.

7. Magnetic recording members having excellent magnetic properties can be obtained using magnetic iron oxides having the above described advantages (1) to (6).

The present invention will be explained in greater detail by reference to the following examples. It is to be understood that many variations can be made in the components, proportions, operational sequence, and the like without departing from the spirit of the present invention. The present invention is not to be considered as being restricted to the following examples. Unless otherwise indicated herein, all parts, percents, ratios and the like are by weight.

EXAMPLE 1

In 250 liters of water was dissolved 57.3 Kg of ferrous sulfate ($FeSO_4 \cdot 7H_2O$), and a solution prepared by dissolving 10.8 Kg of NaOH in 100 liters of water was added to the resulting solution. The mixture was reacted at 30° C while bubbling air therethrough, whereby needle-like $\alpha$-FeOOH nuclei were obtained.

Further, 0.98 Kg of cobalt sulfate ($CoSO_4 \cdot 7H_2O$) was added, and the resulting mixture was reacted while adjusting the pH thereof to 6.0 with a 2N NaOH aqueous solution and bubbling air therethrough at 40° C, whereby a goethite layer containing cobalt was formed on the surface of the needle-like nuclei. Goethite particles having an average length of 0.5 $\mu$ and containing 1.65 atom % of Co were obtained.

The thus obtained Co-containing goethite particles were washed and dried, and then introduced to a kiln, dehydrated while blowing air at 400° C through the oven, and reduced with town gas at 360° C, whereby a magnetic iron oxide was obtained. This magnetic iron oxide had the formula $MO_x$ wherein $x$ was 1.34 and M was Fe+Co and the Co content was 1.65 atom %.

This magnetic iron oxide was uniformly oxidized while blowing air diluted to 1/10 by volume with nitrogen therethrough so as to adjust $x$ to 1.4, and then the magnetic iron oxide was cooled and removed. At this time, the coercive force of the magnetic iron oxide was 482 Oe.

With the thus obtained magnetic iron oxide ($MO_x$, $x=1.4$), the variation with time of coercive force due to heat-treatment was examined. The results obtained are shown in Table 1.

Table 1

| Sample | Treatment Temp. | Treatment Period (days) | | | | |
|---|---|---|---|---|---|---|
| | | 1 | 2 | 3 | 4 | 5 |
| | (° C) | (Oe) | (Oe) | (Oe) | (Oe) | (Oe) |
| 1 | 85 | 518 | 520 | 521 | 522 | 523 |
| 2 | 70 | 530 | 536 | 538 | 539 | 541 |
| 3 | 55 | 536 | 552 | 560 | 564 | 570 |
| 4 | 40 | 524 | 544 | 550 | 556 | 564 |
| 5 | 30 | 507 | 516 | 522 | 528 | 538 |
| 6 | Storage at Room Temperature (25° C) | 498 | 507 | 512 | 516 | 524 |

Table 1-continued

| Sample | Treatment Temp. | Treatment Period (days) | | | | |
|---|---|---|---|---|---|---|
| | | 1 | 2 | 3 | 4 | 5 |

The increase in the coercive force of the magnetic iron oxide nearly saturated in a period of the order of about 100 days at room temperature and the final coercive force was 583 Oe.

These results show that the coercive force reached about 95% of the final (saturated) coercive force by applying heat-treatment at 40° to 80° C for 3 days, and that if the heat-treatment was carried out at 55° C, the coercive force reached 95% of the final coercive force in 2 days. Thus, it has been confirmed that where the magnetic material was allowed to stand at room temperature, the coercive force reached about 90% of the final coercive after 7 days, whereas if the heat-treatment was carried out at about 55° C, the coercive force could be stabilized in a very short period of time and thus this heat-treatment is advantageous from an industrial standpoint.

EXAMPLE 2

A magnetic iron oxide obtained as in Example 1 ($MO_x$, $x=1.4$, M = Fe+Co, Co=1.65 atom %) was subjected to heat-treatment under the conditions as shown in Table 2.

Table 2

| Sample | Treatment Temperature | Treatment Period |
|---|---|---|
| | stored | (days) |
| 7 | at room temperature (25° C) | 2 |
| 8 | " | 7 |
| 9 | " | 20 |
| 10 | " | 43 |
| 11 | 40° C | 4 |
| 12 | 55° C | " |
| 13 | 70° C | " |
| 14 | 85° C | " |

Using these Samples 7 to 14, magnetic recording members were prepared according to the following:

| | Parts by weight |
|---|---|
| Magnetic Iron Oxide | 300 |
| Vinyl Chloride-Vinyl Acetate Copolymer (monomer weight ratio = 87:13) | 40 |
| Epoxy Resin (reaction product of bisphenol A and epichlorohydrin; epoxy equivalent: about 230–270; molecular weight about 470) | 30 |
| Silicone Oil (polydimethylsiloxane) | 5 |
| Toluenesulfonic Acid Ethyl Amide | 7 |
| Ethyl Acetate | 250 |
| Methyl Ethyl Ketone | 250 |

The above components were fully kneaded in a ball mill, and then 20 parts by weight of Desmodur L-75 (produced by Bayer A.G., a 75% solution of an isocyanate compound comprising the reaction product of 3 moles of toluenediisocyanate and 1 mole of trimethylol propane in ethyl acetate) was added and uniformly mixed to produce a magnetic coating solution.

This magnetic coating solution was coated on a 20 $\mu$m thick polyethylene terephthalate film in a dry film thickness of 6 $\mu$m, which was subjected to an orientation-treatment in a DC magnetic field of 1000 Oe, dried, and slit to a ¼ inch width to produce magnetic tapes.

Each tape was cut to a length of 10 m, reeled, allowed to stand at 30° C for 24 hours, and the print-through effect measured. The measurement was conducted using a Level Recorder, Brüel & Kjoer A.G. Type 2305, in dB units, and the results obtained are shown in Table 3. Higher dB values indicate a better print-through effect, that is, when the dB is high, the print-through signal is small. This measurement was conducted in accordance with the method of JIS-5542.

Table 3

| Sample | Print-Through Effect (dB) |
|---|---|
| 7 | 44 |
| 8 | 46 |
| 9 | 49 |
| 10 | 50 |
| 11 | 47 |
| 12 | 50 |
| 13 | 51 |
| 14 | 49 |

It has been found that the print-through of the magnetic tapes was improved gradually with time, and it has been confirmed that an improvement in the print-through effect could be achieved by application of a heat-treatment.

EXAMPLE 3

Two hundred eighty-five grams of a magnetic iron oxide, $FeO_x$ ($x=1.38$, Hc = 432 Oe) was finely pulverized and dispersed in 3 liters of water. To the resulting slurry was added 15.0 g of cobaltous chloride ($CoCl_2 \cdot 6H_2O$). After the slurry was stirred for 30 minutes, 30 ml of aqueous ammonia (29%) was added at an equal rate over one minute, and stirring was continued for 30 minutes. The thus obtained slurry was water-washed to produce a cake, and the cake was gradually dried at 40° C and subjected to heat-treatment in an atmosphere of nitrogen at 400° C for 1 hour whereby cobalt ions were diffused in the magnetic iron oxide. The magnetic iron oxide was cooled to 100° C at a rate of 2° C/min and further cooled to room temperature, and removed whereby a Co-containing magnetic iron oxide was obtained. At this time, the coercive force increased to 510 Oe.

The magnetic iron oxide so produced was subjected to the same heat-treatment as used in Example 1, and the variation in coercive force was examined. The results obtained are shown in Table 4.

Table 4

| Sample | Treatment Temperature (° C) | Hc (Oe) on Storage |||||
|---|---|---|---|---|---|---|
| | | After 1 Day | After 2 Days | After 3 Days | After 4 Days | After 7 Days |
| 15 | 85 | 552 | 556 | 558 | 559 | 560 |
| 16 | 70 | 558 | 576 | 580 | 582 | 584 |
| 17 | 55 | 555 | 580 | 586 | 590 | 594 |
| 18 | 40 | 537 | 555 | 565 | 572 | 580 |
| 19 | 30 | 525 | 533 | 540 | 547 | 560 |
| 20 | Stored at Room Temperature | 518 | 524 | 532 | 536 | 547 |

The increase in the coercive force of the magnetic iron oxide tended to become saturated after about 40 days at room temperature, and the coercive force after 40 days was 608 Oe.

Thus it has been found that the heat-treatment at 40° to 70° C was quite effective in stabilizing the coercive force, which is advantageous from an industrial standpoint.

EXAMPLE 4

The procedure of Example 3 was repeated to prepare five samples wherein the amount of cobalt chloride added was changed as shown in Table 5. The coercive force (Hc) of these five samples was measured immediately after sample production and 100 days later, and the results obtained are shown in Table 5.

Table 5

| Sample | Amount of $CoCl_2 \cdot 6H_2O$ Added (g) | Co Content (atom %) | Hc just after Production (Oe) | Hc after 100 Days (Oe) |
|---|---|---|---|---|
| 21 | 15.0 | 1.7 | 515 | 610 |
| 22 | 30.0 | 3.6 | 640 | 870 |
| 23 | 42.0 | 4.6 | 855 | 1090 |
| 24 | 53.0 | 5.7 | 1030 | 1310 |
| 25 | 62.0 | 6.6 | 1160 | 1520 |

These Samples 21 to 25 were subjected to heat-treatment at the temperatures shown in Table 6 for one hour, and the coercive force (Hc) of the samples after 3 days is shown in Table 6.

Table 6

| Sample | Hc (Oe) |||||
|---|---|---|---|---|---|
| | Room Temperature (25° C) | 40° C | 55° C | 70° C | 85° C |
| 21 | 525 | 578 | 593 | 580 | 568 |
| 22 | 669 | 792 | 838 | 802 | 768 |
| 23 | 880 | 1010 | 1055 | 1030 | 985 |
| 24 | 1115 | 1220 | 1255 | 1230 | 1180 |
| 25 | 1230 | 1395 | 1470 | 1420 | 1360 |

EXAMPLE 5

In 250 liters of water was dissolved 57.3 Kg of ferrous sulfate ($FeSO_4 \cdot 7H_2O$), and a solution prepared by dissolving 10.8 Kg of NaOH in 100 liters of water was added to the resulting solution. The mixture so prepared was reacted by bubbling air therethrough at 30° C whereby needle-like $\alpha$-FeOOH nuclei were obtained. Then 0.98 Kg of cobaltous sulfate ($CoSO_4 \cdot 7H_2O$) was added, and the mixture was reacted by bubbling air therethrough at 40° C while keeping the pH of the mixture at 6.0 with a 2N NaOH aqueous solution so as to form a cobalt-containing goethite layer on the surface of the needle-like nuclei. As a result, goethite particles having an average length of 0.5 $\mu$ and containing 1.65 atom % Co were obtained.

The thus obtained Co-containing goethite particles were washed with water and dried, and then dehydrated in a kiln while blowing air at 400° C through the kiln. The goethite so treated was reduced with town gas at 360° C whereby a magnetic iron oxide was obtained. This magnetic iron oxide had the formula $MO_x$ wherein $x$ was 1.34 and M was Fe+Co, and the cobalt content was 1.65 atom %.

This magnetic iron oxide was uniformly oxidized by blowing air diluted to 1/10 by volume with nitrogen and heated to 150° C therethrough so as to adjust $x$ to 1.4, and the magnetic iron oxide was then cooled and removed. The coercive force of the thus obtained Co-containing magnetic iron oxide was 4820 Oe.

Using this Co-containing magnetic iron oxide, a magnetic recording member was produced according to the following

|  | Parts by weight |
|---|---|
| Magnetic Iron Oxide (Co = 1.65 atom %, Hc = 482 Oe) | 300 |
| Vinyl Chloride-Vinyl Acetate Copolymer (monomer weight ratio = 87:13) | 40 |
| Epoxy Resin (as described in Example 1) | 30 |
| Silicon Oil (polydimethylsiloxane) | 5 |
| Toluenesulfonic Acid Ethyl Amide | 7 |
| Ethyl Acetate | 250 |
| Methyl Ethyl Ketone | 250 |

The above components were sufficiently kneaded in a ball mill, and 20 parts by weight of Desmodur L-75 was added and uniformly mixed to form a magnetic coating solution.

This magnetic coating solution was coated on a 20 $\mu$m thick polyethylene terephthalate film in a dry thickness of 6 $\mu$m. The thus coated film was subjected to an orientation-treatment in a DC magnetic field of 100 Oe, dried, and slit to a ¼ inch width to produce magnetic tapes.

Five magnetic tapes were prepared and subjected to heat-treatment at the temperatures shown in Table 7, and the variations in coercive force (Hc) of the samples after a definite time (1, 2, 3, 4, and 7 days) were measured. The results obtained are shown in Table 7.

Table 7

| Sample | Heat-Treatment Temperature (° C) | Hc (Oe) | | | | |
|---|---|---|---|---|---|---|
| | | 1 Day | 2 Days | 3 Days | 4 Days | 7 Days |
| 26 | 85 | 520 | 524 | 523 | 525 | 526 |
| 27 | 70 | 525 | 538 | 540 | 543 | 545 |
| 28 | 55 | 529 | 540 | 547 | 552 | 555 |
| 29 | 40 | 514 | 527 | 531 | 537 | 547 |
| 30 | Storage at Room Temperature (25° C) | 487 | 495 | 492 | 500 | 503 |

The above results show that the application of heat-treatment after the production of a magnetic tape is effective to stabilize the coercive force.

It has been found from the above examples that the coercive force (Hc) of a magnetic iron oxide containing ions such as $Fe^{2+}$, $Co^{2+}$, and the like reaches its equilibrium value at each temperature, and the rate at which the coercive force reaches its equilibrium value, is higher as the temperature is higher, and at room temperature (about 25° C), three months to more than six months is required for the coercive force to reach its equilibrium value.

Therefore, in stabilizing the coercive force of a magnetic powder or magnetic recording member, which is generally used at room temperature, the heat-treatment preferably is carried out at temperatures at which the time necessary for the stabilization is as short as possible from an industrial standpoint, and at which the equilibrium value of the coercive force is obtained which is little different from that at room temperature, that is, a magnetic iron oxide or magnetic recording member is subjected to heat-treatment at a temperature of about 40° C or more, preferably from 40° to 80° C.

While the invention has been described in detail and with reference to specific embodiments thereof, it will be apparent to one skilled in the art that various changes and modifications can be made therein without departing from the spirit and scope thereof.

What is claimed is:

1. A process for stabilizing the magnetic properties of a ferromagnetic material which comprises heat-treating a needle-like ferromagnetic material having the formula $FeO_x$ and containing at least 0.5 atom % of cobalt wherein $x$ is the degree of oxidation and ranges from 1.36 to 1.47 at a temperature of at least about 40° to 80° C for a time sufficient to achieve the stabilization of said magnetic properties.

2. The process according to claim 1, wherein the heat-treating is at a temperature of from 50° to 60° C.

3. The process according to claim 1, wherein the cobalt content is about 1 to 10 atom %.

4. The process according to claim 1, wherein the heat-treating is in an inert gas atmosphere.

5. The process according to claim 4, wherein the inert gas is nitrogen.

6. A process for stabilizing the magnetic properties of a magnetic recording member which comprises providing a ferromagnetic recording layer comprising (1) a ferromagnetic powder represented by the formula $FeOx$ and containing at least 0.5 atom % of cobalt wherein $x$ is the degree of oxidation and ranges from 1.36 to 1.47 and (2) a binder, on a support, and heat-treating said ferromagnetic recording layer at a temperature of at least about 40° to 80° C for a time sufficient to achieve the stabilization of said magnetic properties.

7. The process according to claim 6, wherein the binder is selected from the group consisting of a thermoplastic resin and a thermosetting resin.

8. The process according to claim 6, wherein the weight ratio of the ferromagnetic powder to the binder is about 100:10 to 100:200.

9. The process according to claim 6, wherein the magnetic recording layer additionally contains at least one of a dispersing agent, a lubricant, an abrasive agent, and an antistatic agent.

* * * * *